United States Patent [19]

Deutschmann et al.

[11] Patent Number: 4,570,442
[45] Date of Patent: Feb. 18, 1986

[54] RECIPROCATING PISTON INTERNAL COMBUSTION ENGINE

[75] Inventors: Herbert Deutschmann, Friedrichshafen; Gerhard Haussmann, Tettnang; Ewald Kamleitner, Friedrichshafen, all of Fed. Rep. of Germany

[73] Assignee: MTU-Motoren-und Turbinen-Union Friedrichshafen GmbH., Friedrichshafen, Fed. Rep. of Germany

[21] Appl. No.: 692,722

[22] Filed: Jan. 18, 1985

[30] Foreign Application Priority Data

Mar. 28, 1984 [DE] Fed. Rep. of Germany ....... 3411408

[51] Int. Cl.[4] ............................................. F02B 37/00
[52] U.S. Cl. ........................................ 60/612; 60/600; 60/602
[58] Field of Search ................. 60/612, 611, 600, 601, 60/602, 603, 606

[56] References Cited

U.S. PATENT DOCUMENTS 4,299,090 11/1981 Deutschmann ..................... 60/606
4,418,536 12/1983 Deutschmann ..................... 60/612

FOREIGN PATENT DOCUMENTS 2609389 9/1977 Fed. Rep. of Germany ........ 60/612
2809202 9/1979 Fed. Rep. of Germany ........ 60/612

*Primary Examiner*—Douglas Hart
*Attorney, Agent, or Firm*—Craig & Burns

[57] ABSTRACT

A piston internal combustion engine in which for the engagement and disengagement of an exhaust gas turbocharger (12), its exhaust gas closure device (33) is opened, respectively, closed only so far that the charging air pressure produced by the continuously engaged exhaust gas turbocharger (11) remains approximately constant. By re-routing a small air quantity by way of a by-pass line (36) to the suction side of the compressor (24), the power input of the compressors (21 and 24) is kept small. During the engagement of the exhaust gas turbocharger (12), a small energy quantity is therefore sufficient in order to accelerate the same to its operating rotational speed. Thereafter, the engaging operation is terminated by complete opening of the exhaust gas closure device (33) and by opening of the charging air closure device (34).

4 Claims, 1 Drawing Figure

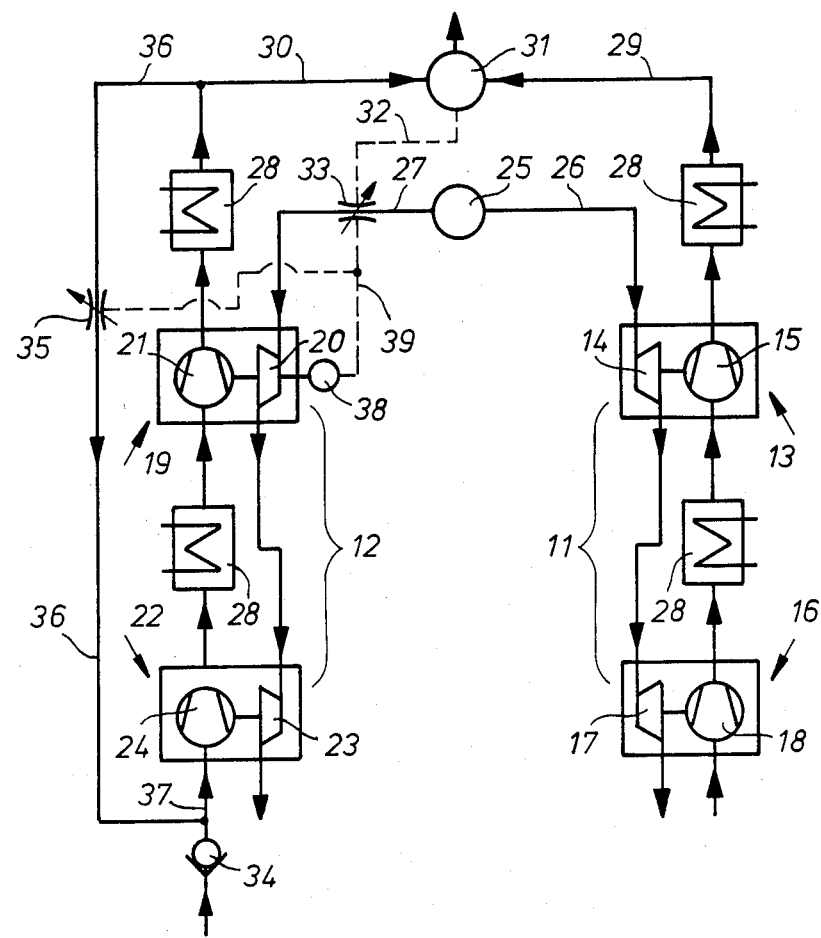

RECIPROCATING PISTON INTERNAL COMBUSTION ENGINE

The present invention relates to a piston internal combustion engine with several exhaust gas turbochargers, of which during partial load operation of the internal combustion engine, one or several exhaust gas turbochargers are adapted to be cut-off or disengaged, with one closure device each in the exhaust gas line and in the suction line of each exhaust gas turbocharger adapted to be disengaged, whereby the through-flow cross section of both closure devices are controlled during the engagement or disengagement of the respective exhaust gas turbocharger.

The disengagement of exhaust gas turbochargers is carried out in piston internal combustion engines for increasing the charging air pressure and charging air quantity with a yield of exhaust gas energy reduced compared to the full-load operation, i.e., in the partial load and partial rotational speed range of the piston internal combustion engine. With low exhaust gas energy yield, only one exhaust gas turbocharger thereby operates, with which one or several exhaust gas turbochargers are connected in parallel little by little with an increase of the output of the piston internal combustion engine until finally at full load operation all existing exhaust gas turbochargers operate together.

During each engagement operation, the exhaust gas turbocharger to be additionally engaged must reach its operating rotational speed corresponding to the conditions when it is engaged or cut-in. If no external energy sources are available for that purpose, the exhaust gas turbocharger must obtain the energy necessary for the acceleration from the exhaust gases of the internal combustion engine. If the rotational speed increase takes place in a very short period of time, for example, by a sudden opening of the exhaust gas closure device, then approximately half of the exhaust gas energy is removed thereby from the continuously engaged exhaust gas turbocharger. As a result thereof, the charging air pressure drops temporarily because the exhaust gas turbocharger which is to be engaged, initially does not supply any charging air. A poor combustion is the consequence thereof which becomes noticeable by a brief soot exhaust.

A piston internal combustion engine of the aforementioned type is disclosed in the DE-PS No. 30 32 435, in which an operable connection is arranged between the exhaust gas- and the charging air-closure device, which during the engagement of the exhaust gas turbocharger with a still closed charging air closure device, permits an opening of the exhaust gas closure device only up to an intermediate position, in which the rotational speed of the non-supplying turbocharger is limited to permissive values and which permits a further opening of the exhaust gas closure device only together with or after the opening of the charging air closure device.

In this prior art patent, the exhaust gas turbocharger is accelerated in two stages, however, immediately following one another in a short period of time, and a lowering of the air excess in the cylinder fillings occurs temporarily.

Additionally, a piston internal combustion engine has been proposed (DE-OS No. 28 09 202) in which the charging air closure device for the exhaust gas turbocharger adapted to be disconnected is arranged downstream of its compressor. During the engagement, the exhaust gas closure device is to be continuously opened further as a function of the charging air pressure of the engaged exhaust gas turbocharger for such length of time until the compressor of the exhaust gas turbocharger to be engaged reaches this charging air pressure. The air supplied by the exhaust gas turbocharger to be connected is to be discharged thereby by way of a valve in such a manner that the compressor is operated approximately on a parabolically shaped curve in the compressor diagram.

As a result thereof, the compressor to be interconnected takes up ever more input power in the course of the engaging operation; however, the air supplied by the same does not serve the supercharging of the internal combustion engine.

In addition to the drive of the continuously engaged exhaust gas turbocharger, the internal combustion engine is able to produce this additional power only by an increase of its exhaust gas temperature and of its fuel consumption as well as by a strong soot formation. This engaging operation is particularly disadvantageous in that the internal combustion engine, depending on the given application, is operated for longer periods of time in this range lying between shifting beginning and shifting end.

It is therefore the object of the present invention to decrease as much as possible the charging air shortage occurring during the shifting operation, which occurs in particular with such supercharged internal combustion engines in which the entire operating range must be covered with only few exhaust gas turbochargers.

The underlying problems are solved according to the present invention in that during the engagement with increasing yield in exhaust gas energy, at first the exhaust gas closure device of the exhaust gas turbocharger to be interconnected is so opened that the continuously engaged exhaust gas turbocharger is continued to be operated at its upper output limit, in that only a very strongly throttled rate of air flow is made possible for the compressor of the exhaust gas turbocharger to be interconnected during the engagement operation by means of a by-pass line adapted to be closed and leading from the charging air line of the internal combustion engine into the suction line of the compressor downstream of the charging air closure device, and in that the complete opening of the exhaust gas closure device is undertaken only when the exhaust gas turbocharger has nearly reached the operating rotational speed necessary for the engagement.

As a result of these measures, the engaged exhaust gas turbocharger initially supplies the charging air for the internal combustion engine during the engagement in the same manner as in the DE-OS No. 29 09 202 and only the excess exhaust gas energy is conducted to the turbine of the exhaust gas turbocharger to be engaged. Since, however, the required input or driving power of this exhaust gas turbocharger is very small by the strongly throttled feed quantity and by its feedback to the suction side of the compressor, its operating rotational speed necessary for the engagement is reached with considerably less excess power compared to the known method. This excess power can be made available without any problem by the internal combustion engine already with a small increase in engine output. Since the compressor is cooled by the air through-flow, each operating point lying within the engaging range can be operated also for longer periods of time without disadvantage for the internal combustion engine or the exhaust gas turbocharger.

The engagement is terminated, as known, with the complete opening of the exhaust gas closure device. Because the exhaust gas turbocharger to be engaged, however, does not have to be significantly accelerated thereby in order to attain its full operating rotational speed and to enable therewith the opening of its charging air closure device, the resulting charging air pressure drop is also very small and practically no longer moticeable.

These and other objects, features and advantages of the present invention will become more apparent from the following description when taken in connection with the accompanying drawing, which shows, for purposes of illustration only, one embodiment in accordance with the present invention, and wherein:

The single FIGURE is a schematic view of a supercharged piston internal combustion engine with a control system in accordance with the present invention.

Referring now to the single FIGURE of the drawing, two two-stage exhaust gas turbochargers 11 and 12 for a piston internal combustion engine (not shown) are schematically illustrated in this drawing. The continuously engaged exhaust gas turbocharger 11 consists of a high-pressure turbocharger 13 with a turbine 14 and a compressor 15 and of a low-pressure turbocharger 16 with a turbine 17 and a compressor 18. The exhaust gas turbocharger 12 adapted to be disconnected consists of a high-pressure turbocharger 19 with a turbine 20 and a compressor 21 and of a low-pressure turbocharger 22 with a turbine 23 and a compressor 24. The exhaust gas turbochargers 11 and 12 are supplied with exhaust gas from an exhaust gas manifold 25 by way of exhaust gas lines 26 and 27. They feed their charging air by way of charging air coolers 28, charging air lines 29 and 30 and a charging air manifold 31 to the internal combustion engine (not shown).

At low load, the exhaust gas turbocharger 12 is separated from the exhaust gas manifold 25 by an exhaust gas closure device 33 controlled by the charging air pressure in the charging air manifold 31 by way of a control line 32. A charging air closure device 34 prevents thereby the discharge of charging air from the charging air manifold 31 by way of the exhaust gas turbocharger 12.

A by-pass line 36 adapted to be controlled by means of a valve 35, which branches off from the charging air line 30, terminates in a suction line 37 of the compressor 24 downstream of the charging air closure device 34. A control line 39 leads additionally from a rotational speed pick-up 38 of the high-pressure turbocharger 19 to the exhaust gas closure device 33.

If with increasing output of the piston internal combustion engine the upper output limit of the continuously engaged exhaust gas turbocharger 11 is reached, then the exhaust gas closure device 33 is opened, controlled by the charging air pressure in the charging air manifold 31 by way of the control line 32, in such a manner that no decrease of the charging air pressure occurs. As a result thereof, the disconnected exhaust gas turbocharger 12 is set into rotation and accelerated depending on yield of excess power in the exhaust gas of the piston internal combustion engine. Its air quantity supplied thereby is fed back into its suction line 37 by way of the by-pass line 36 with an opened valve 35. This air quantity is strongly limited by the opened valve cross section or by the cross section of the by-pass line.

As a result thereof, the taken-up power of the compressors 21 and 24 is very low, and the exhaust gas turbocharger 12 reaches its operating rotational speed required for the engagement already with little excess power.

Since the circulating air quantity cools the compressors 21 and 24, also conditioned by the charging air cooler 28, the internal combustion engine can be operated, if necessary, for longer periods of time within the engaging range without the occurrence of an overheating of the compressors. Shortly prior to reaching their operating rotational speed, the exhaust gas closure device 33 is fully opened by way of a signal in the control line 39 and at the same time the valve 35 is closed. As a result thereof, the charging air closure device 34 opens automatically or, as described in the DE-PS No. 30 32 435, in dependence on the opening of the exhaust gas closure device 33. The engaging or interconnecting operation is terminated therewith.

If, with a decreasing output of the internal combustion engine, the exhaust gas energy yield and therewith charging air quantity and charging air pressure drop correspondingly, the exhaust gas closure device 33 is closed continuously or stepwise, controlled, for example, by the charging air pressure in the charging air manifold 31, by way of the control line 32. As a result thereof, the exhaust gas turbocharger 11 receives more exhaust energy and is able to keep the charging air pressure approximately constant even though the exhaust gas turbocharger 12 stops its air supply by closing of the charging air closure device 34. By opening the valve 35, a small air circulation is again maintained thereafter in the by-pass line 36 and in the compressors 21 and 24 until the exhaust gas turbocharger 12 is stopped by final closure of the exhaust gas closure device 33 and therewith the disconnection or disengagement is terminated.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A piston internal combustion engine, comprising several exhaust gas turbocharger means, of which at least one is adapted to be disengaged during partial load operation of the internal combustion engine, an exhaust gas line and a suction line for each exhaust gas turbocharger means adapted to be disengaged, closure means in each of the exhaust gas line and suction line of a respective exhaust gas turbocharger means adapted to be disengaged, and control means for controlling during the engagement or disengagement of the respective exhaust gas turbocharger means the flow cross section of both closure means, said control means being operable during engagement with increasing yield in exhaust gas energy to initially open the exhaust gas closure means of the exhaust gas turbocharger means to be engaged in such a manner that the continuously engaged exhaust gas turbocharger means is continued to be operated near its upper output limit, that only a strongly throttled rate of air flow is made possible to the compressor of the exhaust gas turbocharger means to be engaged during the engaging operation by means of a by-pass line adapted to be closed off which operatively connects a charging air manifold of the internal combustion engine with the suction line of the compressor downstream of the charging air closure means, and that the complete opening of the exhaust gas closure means is undertaken only when the exhaust gas turbocharger means has nearly reached the operating rotational speed necessary for the engagement.

2. A piston internal combustion engine according to claim 1, with a charging air cooler means arranged in the line between the charging air manifold of the internal combustion engine and the compressor of the exhaust gas turbocharger means adapted to be disengaged, the by-pass line branching off directly downstream of the charging air cooler means.

3. A piston internal combustion engine, comprising several exhaust gas turbocharger means, of which during partial load operation of the internal combustion engine at least one exhaust gas turbocharger means is adapted to be disengaged, each turbocharger means comprising compressor means and turbine means, a suction line leading to the compressor means and an exhaust gas line leading to the turbine means of the respective exhaust gas turbocharger means, one of said exhaust gas turbocharger means being continuously connected with the internal combustion engine, closure means in the exhaust line and in the suction line leading to a respective exhaust gas turbocharger means adapted to be disengaged, a charging air manifold, the compressor means of each exhaust gas turbocharger means feeding compressed air to the charging air manifold, a by-pass line from the compressor means of the respective exhaust gas turbocharger means adapted to be disengaged from the suction line of the corresponding compressor means downstream of the closure means in the corresponding suction line, valve means in said by-pass line, and control means controlling said closure means and said valve means in such a manner that during the engagement of a respective exhaust gas turbocharger means with increasing yield in exhaust gas energy, the continuously engaged exhaust gas turbocharger means continues to be operated near its upper output limit while only a very strongly throttled rate of air flow is made possible to the compressor means of the exhaust gas turbocharger means to be engaged during the engaging operation by means of the valve means, the complete opening of the exhaust gas closure means being undertaken by said control means only when the exhaust gas turbocharger means to be engaged has nearly reached the operating rotational speed necessary for its engagement.

4. A piston internal combustion engine according to claim 3, further comprising a charging air cooler means connected to the output of the compressor means, the by-pass line branching off substantially directly downstream of the charging air cooler means coordinated to a respective exhaust gas turbocharger means adapted to be engaged.

* * * * *